(12) United States Patent
Moshier

(10) Patent No.: US 8,332,063 B2
(45) Date of Patent: Dec. 11, 2012

(54) APPARATUS AND METHOD FOR PROCESS CONTROL USING PEOPLE AND ASSET TRACKING INFORMATION

(75) Inventor: Kenneth C. Moshier, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 702 days.

(21) Appl. No.: 11/594,679

(22) Filed: Nov. 8, 2006

(65) Prior Publication Data

US 2008/0109099 A1   May 8, 2008

(51) Int. Cl.
*G05B 19/00* (2006.01)

(52) U.S. Cl. ..... 700/108; 700/103; 700/275; 340/572.1; 307/326

(58) Field of Classification Search ............. 700/103, 700/13, 95, 108, 109; 340/571, 572.1, 825.36, 340/825.49, 5.92; 235/485; 307/116, 326; 83/58; 192/125 A, 129 R
See application file for complete search history.

(56) References Cited

U.S. PATENT DOCUMENTS

| | | | |
|---|---|---|---|
| 5,198,702 A * | 3/1993 | McCullough et al. | 307/326 |
| 6,674,368 B2 * | 1/2004 | Hawkins et al. | 340/573.4 |
| 6,725,104 B2 | 4/2004 | Lo et al. | |
| 7,173,539 B2 * | 2/2007 | Schultz | 340/603 |
| 2001/0006384 A1 | 7/2001 | Usaki | |
| 2006/0132300 A1 * | 6/2006 | Howe et al. | 340/539.13 |
| 2006/0238610 A1 * | 10/2006 | Teesdale | 348/14.02 |
| 2007/0132576 A1 | 6/2007 | Kolavennu et al. | |
| 2007/0132577 A1 | 6/2007 | Kolavennu | |
| 2007/0132586 A1 * | 6/2007 | Plocher et al. | 340/572.1 |
| 2007/0132637 A1 | 6/2007 | Kolavennu et al. | |
| 2007/0143072 A1 * | 6/2007 | Campagna | 702/181 |
| 2007/0205861 A1 * | 9/2007 | Nair et al. | 340/5.61 |
| 2007/0205886 A1 | 9/2007 | Huseth et al. | |
| 2007/0241901 A1 | 10/2007 | Cage et al. | |
| 2007/0241965 A1 | 10/2007 | Kolavennu et al. | |
| 2007/0268884 A1 | 11/2007 | Kolavennu et al. | |
| 2008/0109098 A1 | 5/2008 | Moshier et al. | |

OTHER PUBLICATIONS

Collins, Jonathan, "Hospital Gets Ultra-Wideband RFID", Aug. 19, 2004, RFID Journal.*
"n-sight: The Mobile Video Collaboration System (MVCS)", LibreStream, 2007, 5 pages.

* cited by examiner

*Primary Examiner* — Mohammad Ali
*Assistant Examiner* — Sheela S Rao

(57) ABSTRACT

An apparatus, method, and computer program for process control using people and asset tracking information are provided. One or more process control data elements are received, which define a location associated with a person and/or an asset in a processing environment. At least part of the processing environment is controlled using the one or more process control data elements. For example, the processing environment could be controlled based on whether a specified area has been evacuated or whether one or more specified personnel or types of personnel are present in the specified area. The location can also be used to prevent the person and/or the asset from entering a restricted part of the processing environment, identify any people failing to reach specified zones of the processing environment during an incident, and identify a current actual or estimated location of at least one person to be rescued in the processing environment.

22 Claims, 11 Drawing Sheets

APPARATUS AND METHOD FOR PROCESS CONTROL USING PEOPLE AND ASSET TRACKING INFORMATION

CROSS-REFERENCE TO RELATED APPLICATIONS

This application is related to U.S. patent application Ser. No. 11/594,544 entitled "APPARATUS AND METHOD FOR INTEGRATING PEOPLE AND ASSET TRACKING INFORMATION INTO A PROCESS CONTROL SYSTEM" filed on Nov. 8, 2006, now abandoned, which is hereby incorporated by reference.

TECHNICAL FIELD

This disclosure relates generally to process control systems and more specifically to an apparatus and method for process control using people and asset tracking information.

BACKGROUND

Processing facilities are often managed using process control systems. Example processing facilities include manufacturing plants, chemical plants, crude oil refineries, ore processing plants, and coal or other types of mines. Among other operations, process control systems typically manage the use of valves, pumps, and other industrial equipment in the processing facilities.

People and asset tracking systems often provide the ability to track the locations of various people and assets in a particular environment. These systems are routinely used as part of security systems, allowing the security systems to identify when people enter restricted areas or when assets are moved from their designated locations. However, continuous real-time people and asset tracking systems were typically not feasible for covering large indoor or outdoor areas, such as large industrial or other processing facilities. The development of Ultra Wide Band (UWB) Radio Frequency Identification (RFID) tracking technology and other technology has made it possible to track people and assets in very large facilities.

SUMMARY

This disclosure provides an apparatus and method for process control using people and asset tracking information.

In a first embodiment, a method includes receiving one or more process control data elements defining a location associated with at least one of a person and an asset in a processing environment. The method also includes controlling at least part of the processing environment using the one or more process control data elements.

In particular embodiments, the processing environment is controlled based on whether a specified area has been evacuated or whether one or more specified personnel or types of personnel are present in the specified area. In other particular embodiments, the location is used to (i) prevent the person and/or the asset from entering a restricted part of the processing environment, (ii) identify any people failing to reach specified zones of the processing environment during an incident, or (iii) identify a current actual or estimated location of at least one person to be rescued in the processing environment.

In a second embodiment, an apparatus includes at least one memory operable to store one or more process control data elements defining a location associated with at least one of a person and an asset in a processing environment. The apparatus also includes at least one controller operable to control at least part of the processing environment using the one or more process control data elements.

In a third embodiment, a computer program is embodied on a computer readable medium and is operable to be executed. The computer program includes computer readable program code for receiving one or more process control data elements defining a location associated with at least one of a person and an asset in a processing environment. The computer program also includes computer readable program code for controlling at least part of the processing environment using the one or more process control data elements.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
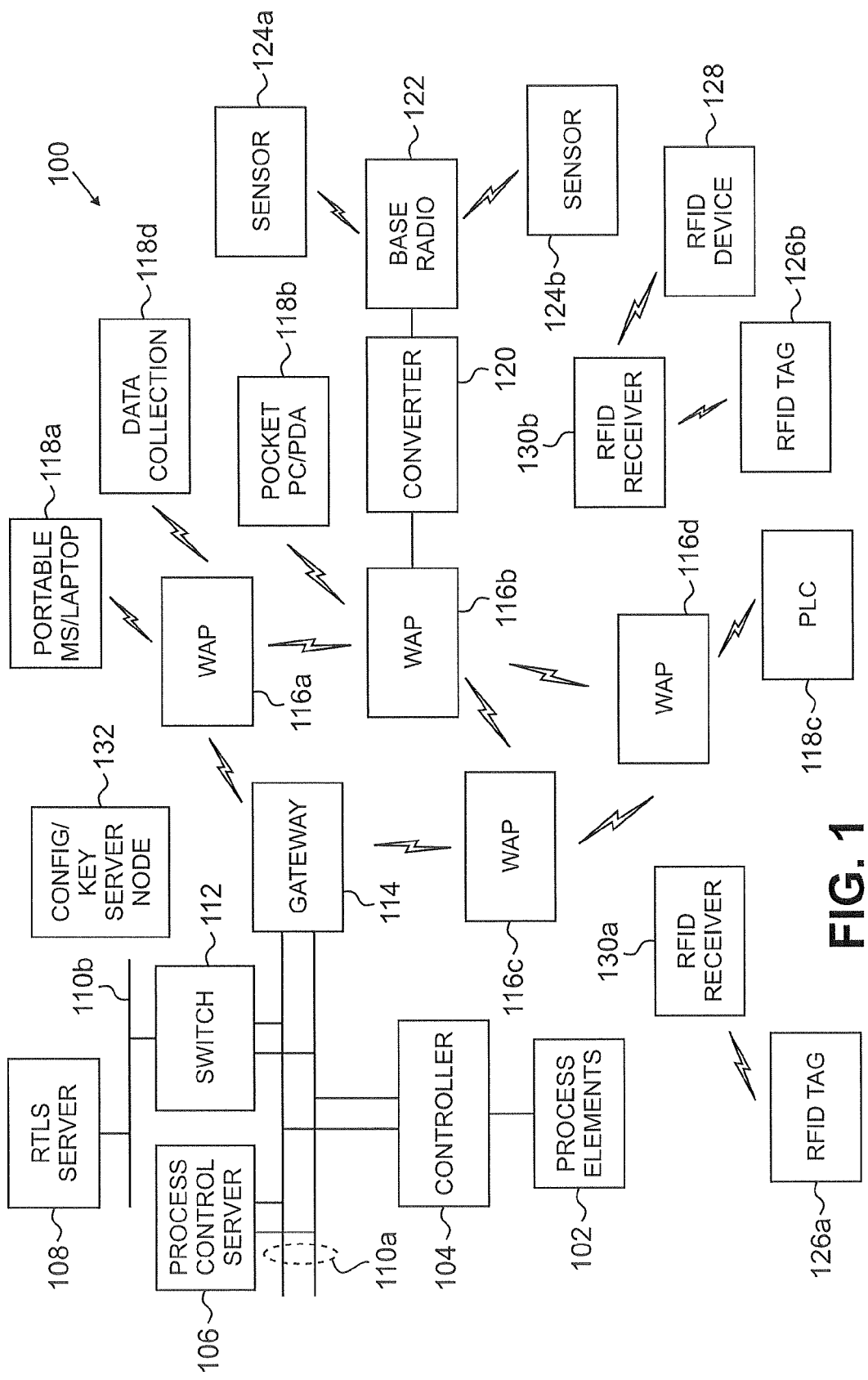
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102. The process elements 102 represent components in a process or production system that may perform any of a wide variety of functions. For example, the process elements 102 could represent valves, pumps, or any other or additional industrial equipment in a processing environment. Each of the process elements 102 includes any suitable structure for performing one or more functions in a processing system.

A controller 104 is coupled to the process elements 102. The controller 104 controls the operation of one or more of the process elements 102. For example, the controller 104 could be capable of providing control signals to one or more of the process elements 102, thereby adjusting the operation of those process elements 102. The controller 104 could also receive information associated with the system 100, such as by receiving sensor measurements of a flow rate of material through a pipe. The controller 104 could use this data to control one or more of the process elements 102, such as by controlling a valve using the measured flow rate. The controller 104 includes any hardware, software, firmware, or combination thereof for controlling one or more process elements 102. The controller 104 could, for example, represent a computing device executing a MICROSOFT WINDOWS operating system.

A process control server 106 communicates with the controller 104. The process control server 106 performs various functions to support the operation and control of the controllers 104 and the process elements 102, thereby controlling one or more processes occurring in a processing environment. For example, the process control server 106 could control and adjust the operation of the controller 104, log information collected or generated by the controller 104, and provide secure access to the controller 104. This may allow the process control server 106 to control a process being performed using the controller 104 and the process elements 102. The process control server 106 includes any hardware, software, firmware, or combination thereof for controlling the operation of at least part of the process control system 100. The process control server 106 could, for example, represent a computing device executing a MICROSOFT WINDOWS operating system. As a particular example, the process control server 106 could execute one or more applications, such as the EXPERION PKS application or the ENTERPRISE BUILDING INTEGRATOR application from HONEYWELL INTERNATIONAL INC.

As described in more detail below, the process control server 106 uses tracking information associated with people and assets within a processing environment in various ways, such as to control a process or perform other functions associated with the processing environment. To support the use of tracking information, the process control server 106 could communicate with a real-time location system (RTLS) server 108. The RTLS server 108 collects tracking information associated with various people and assets in a processing environment, such as a large processing facility. The RTLS server 108 makes this information available to the process control server 106. For example, the RTLS server 108 may collect tracking information and make selected pieces of tracking data available to the process control server 106 continuously or upon request. The RTLS server 108 may also perform any required calculations to identify or estimate the locations of the various people and assets in the processing environment. In this way, the process control server 106 can request appropriate tracking data needed for various control operations, such as ensuring that an area has been evacuated before initiating a dangerous process. The RTLS server 108 includes any hardware, software, firmware, or combination thereof for collecting or providing location information. The RTLS server 108 could, for example, represent a computing device executing a MICROSOFT WINDOWS operating system.

Two networks 110a-110b couple components in the process control system 100. Each of these networks 110a-110b facilitates communication between various components in the system 100. For example, each network may communicate Internet Protocol (IP) packets, frame relay frames, Asynchronous Transfer Mode (ATM) cells, or other suitable information between network addresses. Each network may include one or more local area networks (LANs), metropolitan area networks (MANs), wide area networks (WANs), all or a portion of a global network such as the Internet, or any other communication system or systems at one or more locations. In this particular embodiment, the network 110a represents a redundant pair of networks (such as a redundant pair of Ethernet networks), and the network 110b represents a single network (such as a single Ethernet network).

A switch 112 in this example is used to couple the networks 110a-110b. The switch 112 routes or transports data between the networks 110a-110b, such as by receiving data over the network 110a and forwarding the data to a destination in the network 110b (or vice versa). The switch 112 represents any suitable structure for facilitating communication between multiple networks, such as an Ethernet switch.

As shown in FIG. 1, the process control system 100 also includes one or more wireless systems for communicating with portable devices and other wireless devices in a processing environment. At least some of these wireless devices provide tracking/location information to the RTLS server 108. Any suitable type or types of wireless networks could be used to communicate with the wireless devices and/or to provide tracking information associated with the wireless devices.

In this example, a wireless network is formed using a gateway 114 and wireless access points (WAPs) 116a-116d. The gateway 114 converts data between the protocol(s) used by the network 110a and the protocol(s) used by the wireless access points 116a-116d. For example, the gateway 114 could convert Ethernet-formatted data into a wireless protocol format (such as the IEEE 802.11a, 802.11b, 802.11g, 802.11n, 802.15.3, 802.15.4, or 802.16 protocol format) used by the wireless access points 116a-116d. The gateway 114 could also convert data received from one or more of the wireless access points 116a-116d into Ethernet-formatted data for transmission over the network 110a. The gateway 114 includes any suitable structure for facilitating communication between components or networks using different protocols.

The wireless access points 116a-116d facilitate communication between the gateway 114 and various wireless devices 118a-118d. Each of the wireless access points 116a-116d can receive data from the gateway 114 (either directly or indirectly through one or more other wireless access points) and forward the data towards one or more of the wireless devices 118a-118d. Each of the wireless access points 116a-116d can also receive data from the wireless devices 118a-118d (either directly or indirectly through one or more other wireless access points) and forward the data towards the gateway 114. In this way, the wireless access points 116a-116d form a wireless network capable of providing wireless coverage to a specified area, such as in a large industrial complex. Each of the wireless access points 116a-116d includes any suitable structure facilitating wireless communications between the gateway 114 and the wireless devices 118a-118d. The wireless access points 116a-116d could, for example, include routing or repeater functionality. In some embodiments, the wireless access points 116a-116d form a mesh network and provide redundant communication paths between the gateway 114 and the wireless devices 118a-118d. Moreover, in some embodiments, a wireless access point could be integrated into the gateway 114.

The wireless devices 118a-118d represent fixed or portable devices used in the process control system 100 to perform various functions. For example, in this example embodiment, the wireless devices 118a-118d include a portable mobile station (MS) or laptop computer (118a), a personal digital assistant (PDA) or pocket personal computer (PC) (118b), a programmable logic controller (PLC) (118c), and a portable data collection device (118d). As more particular examples, the wireless devices 118a-118d could include MOBILE PKS and INTELATRAC PKS devices from HONEYWELL INTERNATIONAL INC. Any other or additional wireless devices 118a-118d could be used in the process control system 100, whatever the function or functions provided by the devices.

To facilitate communication with wired devices or other devices that do not use the same protocol(s) as the wireless access points 116a-116d, a converter 120 can be used. The converter 120 converts between protocol(s) used to communicate with one or more of the wireless access points 116a-116d and protocol(s) used by other devices, such as a wireless base station 122 that communicates with wireless sensors 124a-124b. As a particular example, the converter 120 could be coupled to the wireless access point 116b using an Ethernet connection and to the base station 122 using a serial connection. In this example, the converter 120 could convert between the Ethernet protocol (such as a Modbus Ethernet protocol) and the serial protocol (such as a Modbus serial protocol). The converter 120 includes any suitable structure for converting between protocols.

In some embodiments, at least some of the wireless devices 118a-118d could provide tracking or other location identification functionality. For example, a wireless device 118a-118d could include a Global Positioning System (GPS) receiver for identifying the location of the wireless device. The wireless devices 118a-118d could use any other or additional technique to identify their locations, or the wireless devices 118a-118d could omit this functionality all together. Any identified locations of these wireless devices 118a-118d could be provided to the RTLS server 108 for storage and use.

Instead of or in addition to this functionality, the process control system 100 may support the use of RFID technology or other technology to locate people and assets in a processing environment. In the example embodiment shown in FIG. 1, the process control system 100 includes RFID tags 126a-126b and other RFID-enabled devices 128. The RFID tags 126a-126b could represent portable tags affixed to people or assets (such as vehicles or other equipment) in a processing environment. The RFID tags 126a-126b could represent stand-alone tags or tags integrated into other devices or components, such as identification badges. The RFID-enabled devices 128 could represent devices, such as portable sensors, having integrated RFID functionality.

In some embodiments, the RFID tags 126a-126b and the RFID-enabled devices 128 support active RFID, such as active Ultra Wide Band (UWB) RFID technology. In particular embodiments, the RFID tags 126a-126b and the RFID-enabled devices 128 could have a range of up to 1,000 feet or more line of sight and a range of between 150 and 200 feet in typical industrial facilities. However, the ranges of these devices may vary depending on the implementation of the devices and the environment in which the devices are used.

The RFID tags 126a-126b and the RFID-enabled devices 128 communicate with one or more RFID receivers 130a-130b. The RFID receivers 130a-130b receive data from the RFID tags 126a-126b and the RFID-enabled devices 128 and communicate that data to the RTLS server 108. For example, one or more of the RFID receivers 130a-130b could receive data identifying a particular RFID tag 126a-126b or a particular RFID-enabled device 128. This information can be forwarded to the RTLS server 108, along with the identity or location of the RFID receiver(s) 128a-128b that received this information or the location of the particular tag or device as determined by the RFID receiver(s) 128a-128b or the tag or device itself. This may allow the location of the particular RFID tag or device to be received or determined at the RTLS server 108. Depending on the implementation, the RFID receivers 130a-130b may receive information from the RFID tags and other devices after being queried or polled by the RFID receivers 130a-130b (in which case the receivers may form part of RFID transceivers). In other embodiments, the RFID receivers 130a-130b could receive data transmitted by the RFID tags and receivers without prompting by the RFID receivers 130a-130b.

The RFID receivers 130a-130b may communicate with the RTLS server 108 in any suitable manner. For example, one or more of the RFID receivers 130a-130b could be physically wired to the network 110a or 110b. One or more of the RFID receivers 130a-130b could also communicate with the RTLS server 108 via the wireless access points 116a-116d and the gateway 114. The RFID receivers 130a-130b could communicate with the RTLS server 108 in any other suitable manner.

Each of the RFID tags 126a-126b and the RFID-enabled devices 128 includes any suitable structure for transmitting location-related data. The RFID tags 126a-126b and the RFID-enabled devices 128 could, for example, support active UWB RFID technology. As a particular example, the RFID tags 126a-126b and the RFID-enabled devices 128 could represent Class 1 Division 2 devices and be UL 1604 certified. Each of the RFID receivers 130a-130b includes any suitable structure capable of receiving location information from one or more RFID-enabled tags or other devices, such as RFID transceivers.

A configuration and key server node 132 can be used to configure and control various aspects of the process control system 100, including security in the process control system 100. For example, the node 132 could be used by a user to configure the operation of the wireless access points 116a-116d or the RFID receivers 130a-130b. The node 132 could also be used to distribute cryptographic keys or other security data to various components in the process control system 100, such as to the wireless access points 116a-116d, the wireless devices 118a-118d, the RFID tags 126a-126b, the RFID-enabled devices 128, and the RFID receivers 130a-130b. The configuration and key server node 132 could be used to configure or control any other or additional aspects of the process control system 100. Also, the configuration and key server node 132 could be coupled to the network 110a or 110b or communicate wirelessly (such as via the gateway 114 or the wireless access points 116a-116d).

In one aspect of operation, the RTLS server 108 receives and stores location data generated, collected, or provided by components in the process control system 100. For example, the RTLS server 108 could use data from the RFID receivers 130a-130b to track or estimate the locations of various RFID tags and other devices. The RTLS server 108 could also use data received via the wireless access points 116a-116d and the gateway 114 to track or estimate the locations of wireless devices 118a-118d. In some embodiments, the RTLS server 108 could track the locations of thousands of tags and other devices in real-time, where the tracking resolution could be within one foot. The RTLS server 108 can also make this information available to the process control server 106, which could use this information to control various processes or perform other functions. As examples, the process control server 106 could ensure that an area is evacuated or that required personnel or types of personnel are present before initiating a process.

Although FIG. 1 illustrates one example of a process control system 100, various changes may be made to FIG. 1. For example, the process control system 100 could include any number of each individual component. Also, the functional division shown in FIG. 1 is for illustration only. Various components in FIG. 1 could be combined or omitted and additional components could be added according to particular needs. As a particular example, while shown as two separate devices, the functionality of the servers 106-108 could be combined into a single device or further subdivided. Further, while described as supporting multiple wireless networks (such as networks formed by wireless access points 116a-116d and by RFID receivers 130a-130b), the process control system 100 could support any number of wireless networks (including a single network). In addition, FIG. 1 illustrates one operational environment in which the use of tracking/location information can be integrated and used with process control logic. This functionality could be used in any other or additional system or environment.

Figure 2:
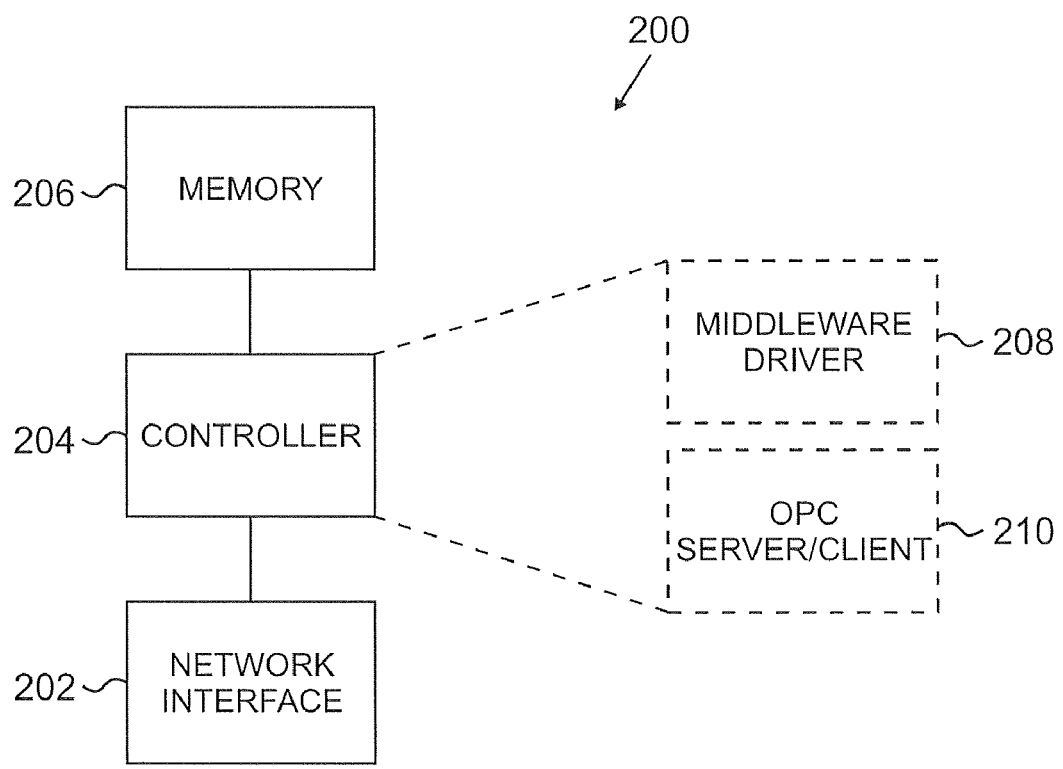
FIG. 2 illustrates an example device for integrating people and asset tracking information into a process control system according to one embodiment of this disclosure.

FIG. 2 illustrates an example device 200 for integrating people and asset tracking information into a process control system according to one embodiment of this disclosure. The embodiment of the device 200 shown in FIG. 2 is for illustration only. Other embodiments of the device 200 may be used without departing from the scope of this disclosure. Also, for ease of explanation, the device 200 is described as representing the RTLS server 108 or the process control server 106 in the process control system 100 of FIG. 1. The device 200 could be used in any other manner in the process control system 100 or in any other system.

As shown in FIG. 2, the device 200 includes a network interface 202, a controller 204, and a memory 206. The network interface 202 facilitates communication by the device 200 over a network, such as network 110a or 110b in the process control system 100. The network interface 202 represents any suitable structure capable of communicating over a network, such as an Ethernet interface.

The controller 204 is coupled to the network interface 202 and the memory 206. The controller 204 performs various functions related to the operation of the device 200. For example, when used in the RTLS server 108, the controller 204 could receive and store location-related data and make that data available to the process control server 106. When used in the process control server 106, the controller 204 could request location-related data from the RTLS server 108 and use the retrieved data to perform various process control functions, such as ensuring that a particular area has been evacuated. The controller 204 includes any hardware, software, firmware, or combination thereof for performing various operations in the device 200. The controller 204 could, for example, represent a microprocessor, digital signal processor, application specific integrated circuit (ASIC), or field programmable gate array (FPGA).

The memory 206 is coupled to the controller 204. The memory 206 stores various information generated, collected, or otherwise used by the device 200. For example, when used in the RTLS server 108, the memory 206 could store location-related data. When used in the process control server 106, the memory 206 could store location-related data retrieved from the RTLS server 108. In each case, the memory 206 could also store programs or instructions and data used by the controller 204 to perform various functions, such as one or more computer programs executed by the controller 204. The memory 206 includes any suitable volatile and/or non-volatile storage and retrieval device or devices.

As noted above, the device 200 could represent the RTLS server 108 or the process control server 106. When used as the RTLS server 108, the device 200 can store information representing the locations of various devices (such as wireless devices 118a-118d, RFID tags 126a-126b, or RFID-enabled devices 128). The location information for one or more of the devices can be retrieved and provided to the process control server 106, either continuously or as requested by the process control server 106.

When used as the process control server 106, the device 200 can use information identifying the locations of various devices to control one or more processes in the process control system 100. This could include refusing to initiate a dangerous change to a process unless a specified area has been evacuated. The device 200 could also use the tracking data in any other manner related to a processing environment, such as detecting non-movement of an injured worker or identifying people who have successfully evacuated an area after an explosion.

In these embodiments, one or more mechanisms can be used to integrate tracking data for use by the process control server 106. In some embodiments, a middleware driver 208 can be executed by the process control server 106 or the RTLS server 108. The middleware driver 208 may represent an application that translates raw location data or other tracking data from one format into a different format suitable for use by the process control server 106. For example, location data from the RTLS server 108 could be received at the process control server 106 over the network 110a in ASCII formatted strings using the Transmission Control Protocol/Internet Protocol (TCP/IP). The middleware driver 208 could convert the TCP/IP ASCII data into Object Linking and Embedding (OLE) for Process Control (OPC) parameters having the form "tag.parameter." Alternatively, the middleware driver 208 could convert the TCP/IP ASCII data into System Control and Data Acquisition (SCADA) data points. The OPC or SCADA data could then be used by the process control server 106 to perform a wide variety of functions.

In other embodiments, an OPC server/client 210 could be implemented in the RTLS server 108 and the process control server 106. More specifically, an OPC client 210 could be implemented in the process control server 106, and an OPC server 210 could be implemented in the RTLS server 108. The OPC client 210 in the process control server 106 can send requests for data to the OPC server 210 in the RTLS server 108, and the OPC server 210 in the RTLS server 108 can respond by providing the requested data to the OPC client 210 in the process control server 106. In these embodiments, the OPC server 210 in the RTLS server 108 could map ASCII text strings stored by the RTLS server 108 into OPC data points for use in the process control server 106.

The following represents additional details regarding one particular implementation of the middleware driver 208 or the OPC server/client 210. Other embodiments of the middleware driver 208 or the OPC server/client 210 could differ from the details provided below. In particular embodiments, the middleware driver 208 or the OPC server 210 in the RTLS server 108 could process data and error messages formatted as ASCII strings. Individual ASCII strings could provide individual pieces of information regarding the location of a wireless device in the process control system 100. An example of the raw ASCII data could be:

T,00000109,41.7,29.4,5.4,13,1113406966,1
    O,00000001,4.7,9.4,5.1,12,1113406966,1
    P,00000109,41.7,29.4,5.4,13,1113406967,1
    R,00000100,41.7,29.4,5.4,13,1113406967,05
    R,00000104,41.7,29.4,5.4,13,1113406967,05
    D,00000111,41,29,4,12,1112360967,04.

In this example, strings beginning with "R" represent 3-D calculation data valid for the x, y, and z directions. Strings beginning with "T" represent 2-D calculation data valid for the x and y directions. Strings beginning with "O" represent 2-D estimated calculation data for the x and y directions. Strings beginning with "P" represent presence indicators, and strings beginning with "D" represent diagnostic packets (used as data quality indicators or line feed characters). Each of these ASCII strings could be mapped by the middleware driver 208 or the OPC server 210 in the RTLS server 108 into OPC data points. Because of this, the middleware driver 208 or the OPC server 210 in the RTLS server 108 helps to convert the locations of people and assets into manageable data that can be used in a wide variety of process control functions. When the middleware driver 208 is used in the process control server 106, the middleware driver 208 could communicate with the RTLS server 108 through the switch 112, and the middleware driver 208 could communicate with the switch 112 using a specified port (such as port 5117).

By facilitating the integration and use of location data for process control, users can be provided with a single solution used for both process control and asset/people tracking. This may help to provide the users with safer and more cost effective control over industrial processes. For example, the integrated system may allow process control workflows and procedures to be automated and coordinated with real-time locations of people and assets. Among other things, this may help to ensure that appropriate precautions are taken during a process (such as evacuating an area or requiring specific personnel to oversee an operation). As a particular example, this may help to ensure easier or more reliable compliance with Occupational Health and Safety Administration (OSHA) safety regulations. Also, the integrated system may allow more useful graphics and other interfaces to be used to facilitate identification of people and assets (as well as associated data) in large industrial or other complexes.

Although FIG. 2 illustrates one example of a device 200 for integrating people and asset tracking information into a process control system, various changes may be made to FIG. 2. For example, the device 200 could include any number of interfaces, controllers, and memories. Also, while shown as using a middleware driver 208 or an OPC server/client 210 to integrate tracking data in a process control system, any other or additional mechanisms could be used to integrate tracking data in a process control system.

FIGS. 3 through 7 illustrate example user interfaces generated using people and asset tracking information in a process control system according to one embodiment of this disclosure. The embodiments of the user interfaces shown in FIGS. 3 through 7 are for illustration only. Other embodiments of the user interfaces may be used without departing from the scope of this disclosure. Also, for ease of explanation, the user interfaces are described as being generated by the process control server 106 in the process control system 100 of FIG. 1. The user interfaces could be generated or used in any other manner in the process control system 100 or in any other system.

As noted above, various techniques can be used to convert tracking data from the RTLS server 108 into data suitable for use by the process control server 106. By doing this, tracking data can be used just like any other process control or security data is used in the process control server 106. These uses can include the generation of alarms and events, the archiving of historical data, the modification of controls for controlling a process, and the generation of various graphics. The graphics can be generated in any suitable manner. For example, in some embodiments, a HMIWEB DISPLAY BUILDER graphical tool from HONEYWELL INTERNATIONAL INC. can be used to draw a representation of an area being monitored by the process control server 106, such as a representation of a plant, unit, or building. Multiple graphics with varying levels of detail and resolution could be used. People and assets being tracked could be represented using hypertext markup language (HTML) graphical objects, which represent the individual tracking tags generated by referencing the OPC tags. The graphical objects may then be configured using the "me.style.xxx" parameters to display movement for real-time representation. For example, HMIWEB DISPLAY BUILDER script properties could include me.style.top (y), me.style.left (x), me.style.width (+x), and me.style.height (+y). These could represent read/write properties and can be used to generate objects representing real-life people or assets being tracked. Additional functionality could be supported by the display, such as "right click" functions to connect to other databases.

Figure 3:
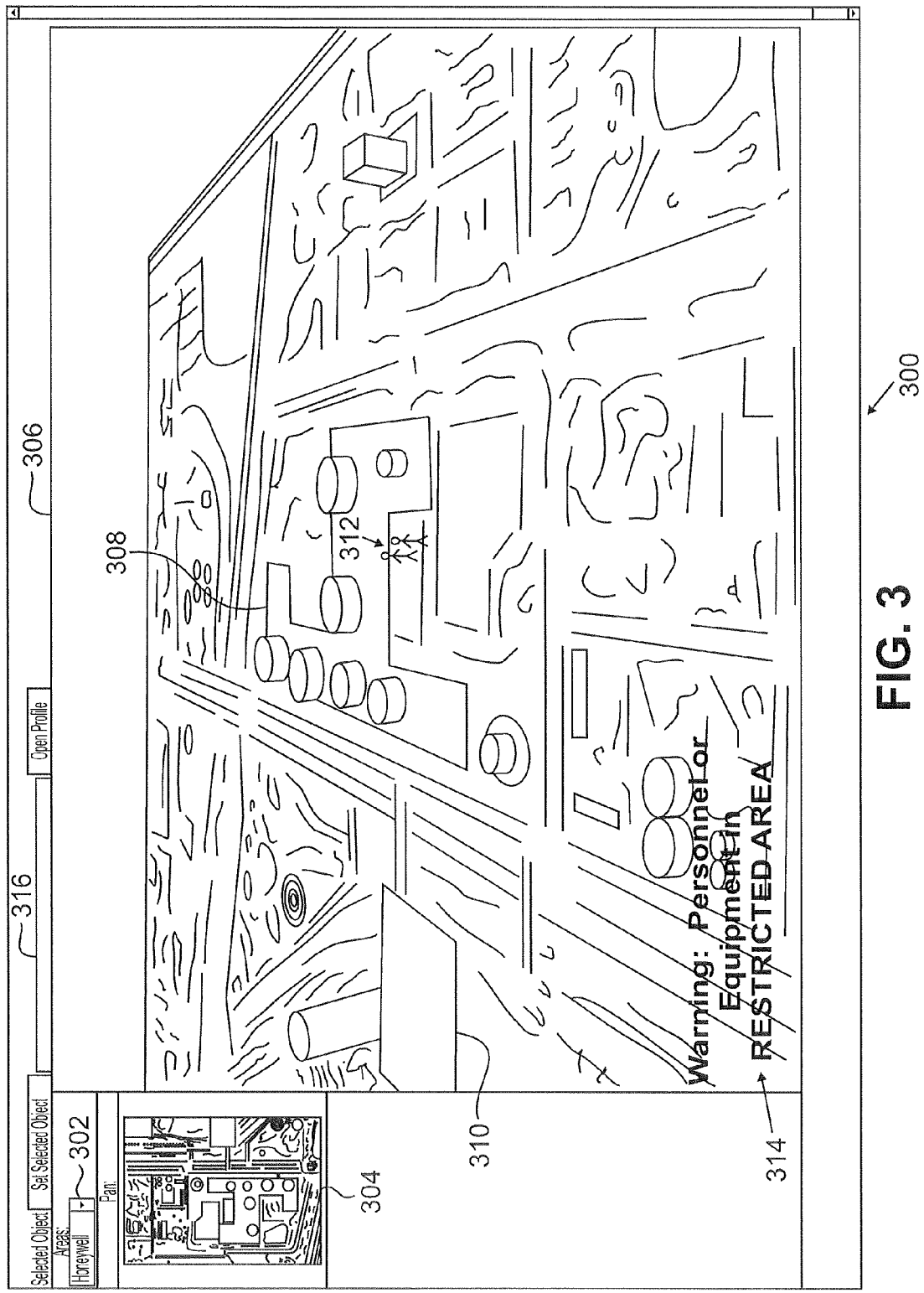
FIGS. 3 through 7 illustrate example user interfaces generated using people and asset tracking information in a process control system according to one embodiment of this disclosure.

One example of this functionality is shown in FIG. 3. In FIG. 3, a user interface 300 includes an area selection menu 302, an area overview 304, and an object tracking region 306. The selection menu 302 allows a user to select different areas (such as different plants, units, buildings, or other areas) for viewing. In this example, the selection menu 302 includes a drop-down menu, although any other suitable technique could be used to select an area for viewing.

The overview 304 presents a high-level overview of the area selected using the selection menu 302. For example, the overview 304 could present the user with an aerial or satellite image of the selected area. In this example, the overview 304 represents an aerial overview of a selected manufacturing facility.

The object tracking region 306 is used to graphically represent the positions of people and assets in the selected area. In this example, three-dimensional images are generated in the object tracking region 306 to represent people, assets, structures, and other features associated with the selected area. For example, the object tracking region 306 includes structural objects 308, which represent buildings, towers, or other physical structures in the selected area. The object tracking region 306 also includes zone definition objects 310, which represent restricted, dangerous, or other zones of the selected area. Note that the zone definition objects 310 can change over time, such as when an area is designated as a hazardous area during the starting or stopping of a process (but designated safe at other times). In addition, the object tracking region 306 includes tracking objects 312, which represent people or assets being tracked in the selected area. As people and assets move in the selected area, the object tracking region 306 can be updated to present the current locations of the people and assets.

In some embodiments, different color codings or other physical identifiers can be associated with the various objects displayed in the object tracking region 306. For example, different colors or patterns could be used to represent different types of towers, buildings, or other structures represented by the structural objects 308. Also, different colors or patterns could be used to represent different types of zone definition objects 310, such as areas restricted for safety, security, and other reasons. In addition, different colors or patterns could be used to represent different statuses of the tracking objects 312, such as when a tracking object 312 has one color when located outside of a restricted area and another color when located inside the restricted area. Moreover, a warning 314 can be displayed to the user when a security violation is detected, such as when a person or asset is in a restricted area.

Controls 316 can be used to locate objects in and obtain additional information about objects in the object tracking region 306. For example, a user could type the name of a person or asset in a text box in the controls 316 and select a "Set Selected Object" button in the controls 316. That person or asset is then identified in the object tracking region 306, such as by changing the color of the object representing that person or asset. At this point, the user could select an "Open Profile" button in the controls 316, which may present the user with detailed information regarding the selected object (such as information associated with a person or asset). These controls are for illustration only. Other or additional controls could be used with the user interface 300, such as controls for zooming into and out of the object tracking region 306.

Figure 4:
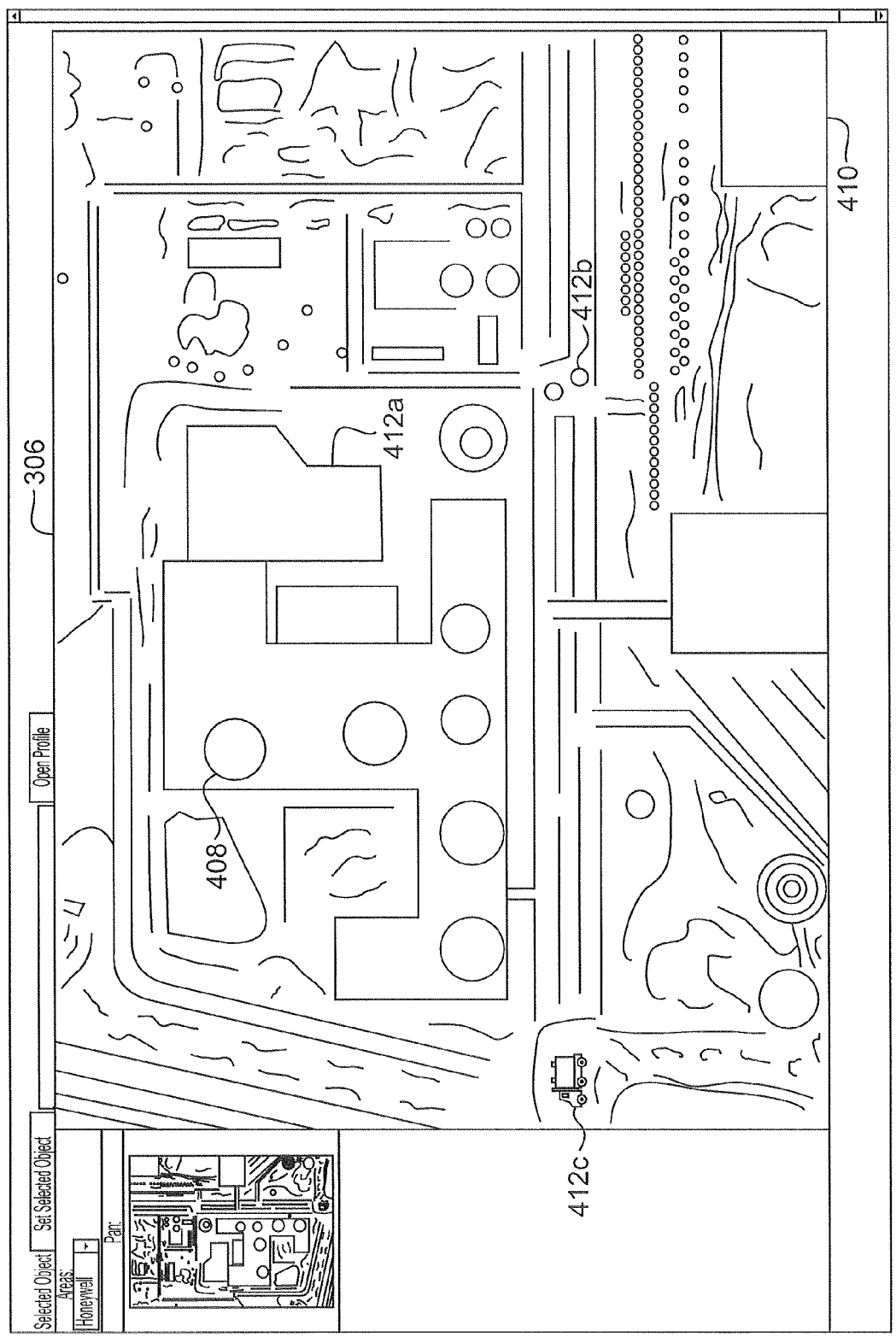

As shown in FIG. 4, the object tracking region 306 could also represent a two-dimensional image identifying different structures, restricted or other areas, and people and assets being tracked. In this example, the object tracking region 306 includes two-dimensional structural objects 408, zone definition objects 410, and tracking objects 412a-412c. These objects could serve the same or similar purpose as the corresponding objects in FIG. 3.

In this example, different types of tracking objects 412a-412c are provided for illustration. Any particular embodiment of a process control system 100 could use none, some, or all of these tracking objects 412a-412c depending on the implementation. The tracking objects 412a-412b are used to represent people, where tracking objects 412a are head-shots of the three-dimensional tracking objects 312 in FIG. 3 and tracking objects 412b are circular icons. The tracking objects 412c represent pictorial icons used to represent different types of assets. In this example, the tracking object 412c represents a truck or other vehicle.

Figure 5:
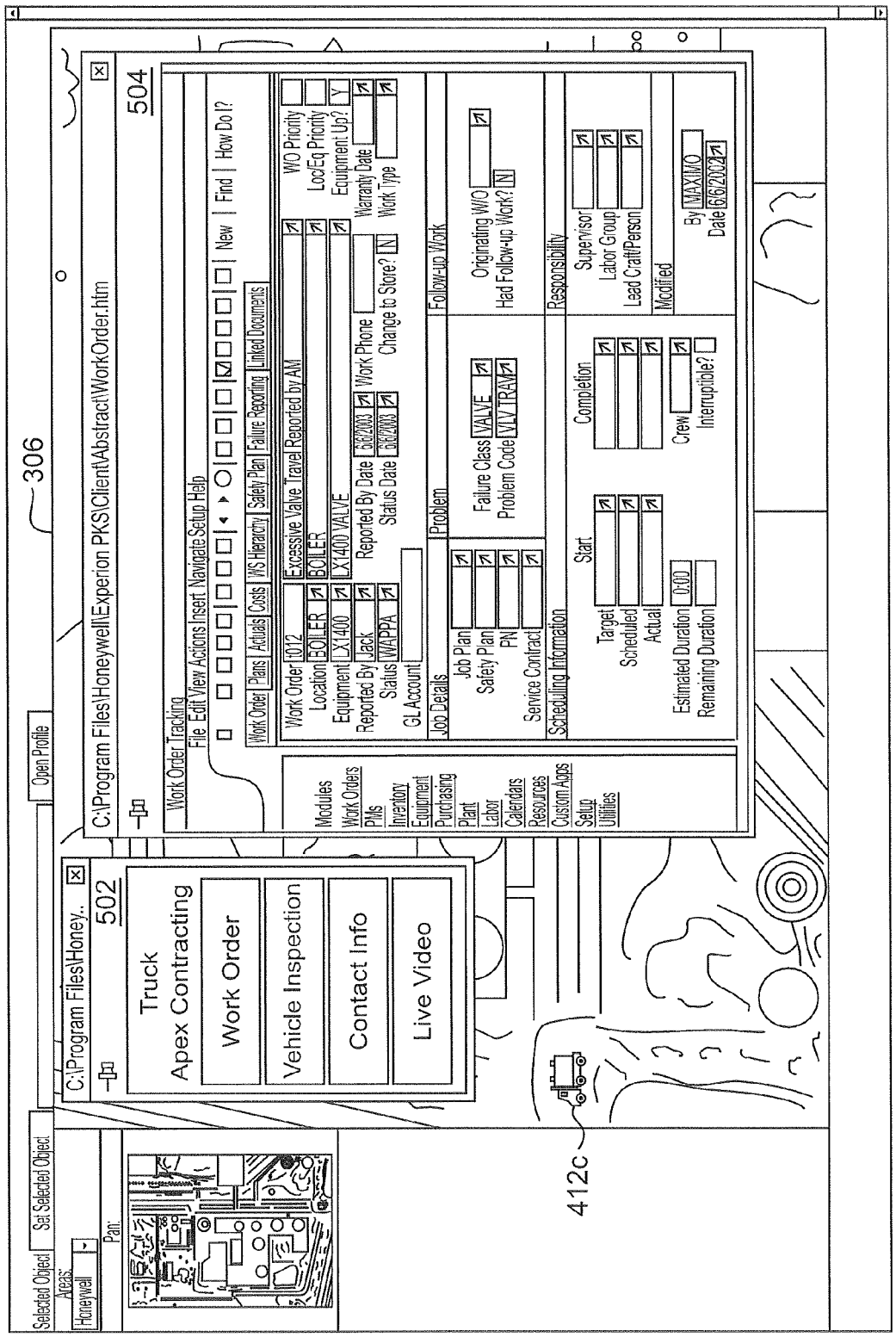

Selection of a particular object in the object tracking region 306 may present the user with one or more windows associated with other applications. An example of this is shown in FIG. 5, where selection of the tracking object 412c (representing a vehicle) presents a window 502 to a user. The window 502 contains text identifying the selected object and controls (such as buttons) for invoking particular functions associated with the asset. For example, the controls in the window 502 could be used to view information regarding a specific work order associated with the vehicle, inspection information related to the vehicle, or contact information associated with the vehicle. The controls could also be used to view real-time video of the vehicle (if it is available).

Selection of the "Work Order" button in the window 502 could present the user with a window 504 as shown in FIG. 5. The window 504 could present the user with detailed information regarding a particular work order. For example, the window 504 could identify a particular problem in a processing facility that led to the creation of a work order, the work to be performed, and a schedule of when the work is to be performed. The user could then view or update the particular details of the work order.

Figure 6:
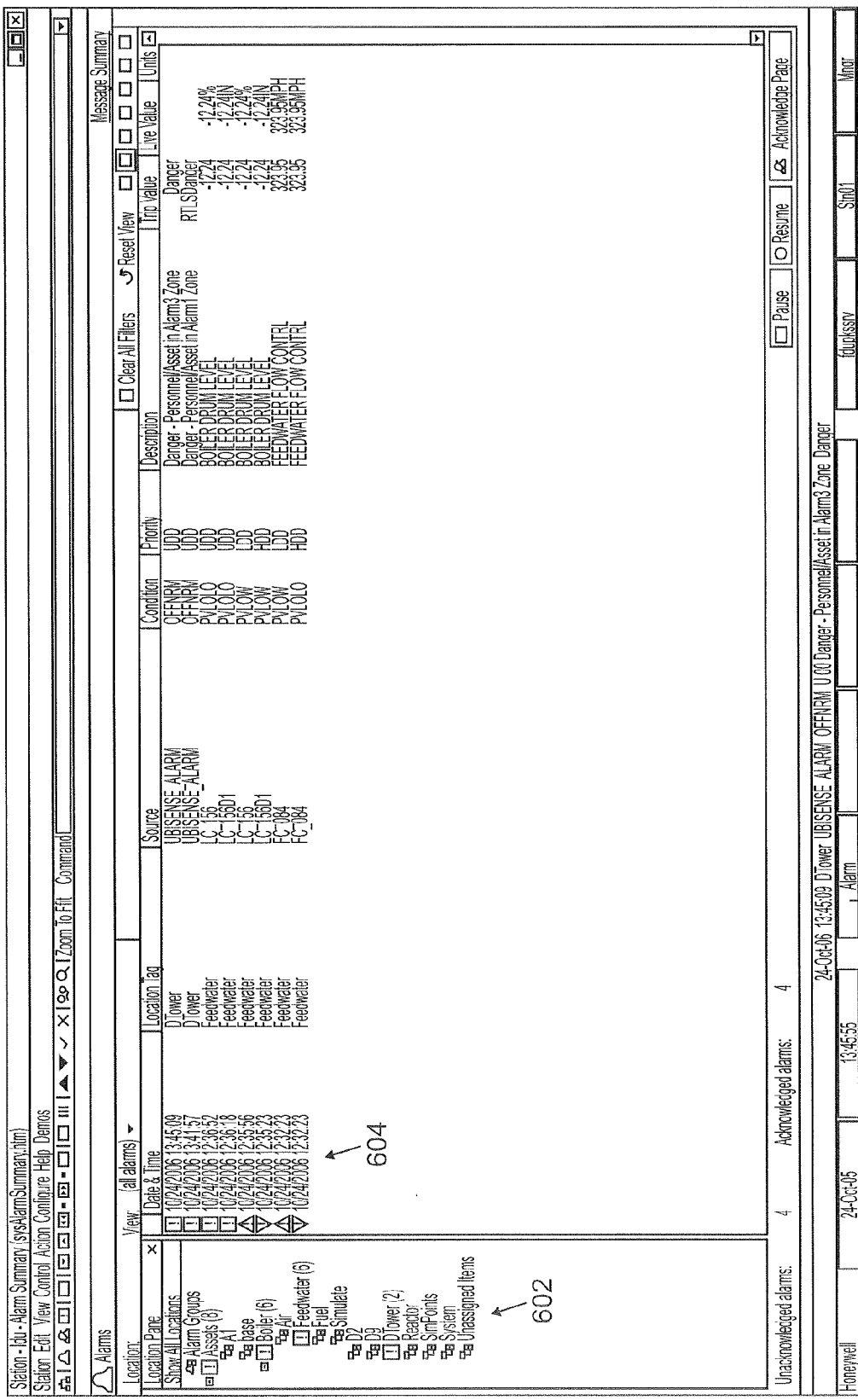

Another user interface 600 is shown in FIG. 6. In this example, the user interface 600 provides a user with a summary of the alarms experienced in all or part of a processing facility. In this example, the user interface 600 includes a tree 602 allowing the user to select different groupings or classifications of alarms. Here, the groupings or classifications of alarms include different groups based on where the alarms occurred. The user interface 600 also includes a list 604 of the alarms for the selected grouping or classification. Here, the list 604 includes the following information for each alarm: date, time, location, source, condition code, priority, description, and trip value associated with each alarm. Additional information could be provided for alarms where appropriate.

As shown in FIG. 6, the location tracking functionality can be used to generate alarms that are integrated into the alarm summary shown in FIG. 6. In this example, the first two alarms listed in FIG. 6 are associated with the presence of a person or asset in a restricted zone. As shown here, the use of tracking data to generated alarms can be integrated seamlessly with the use of other alarms in the process control system 100.

As shown in FIG. 6, the user interface 600 also includes a summary bar 606 at the bottom of the user interface 600. A similar summary bar could appear at the bottom of the user interface 300 shown in FIGS. 3 through 5. The summary bar 606 provides various information to the user, such as the current date and time and an identification of the user, the user's station, and the user's role. The summary bar 606 also includes an "Alarm" indicator, which may flash, change color, or otherwise indicate the existence of a current alarm.

Figure 7:
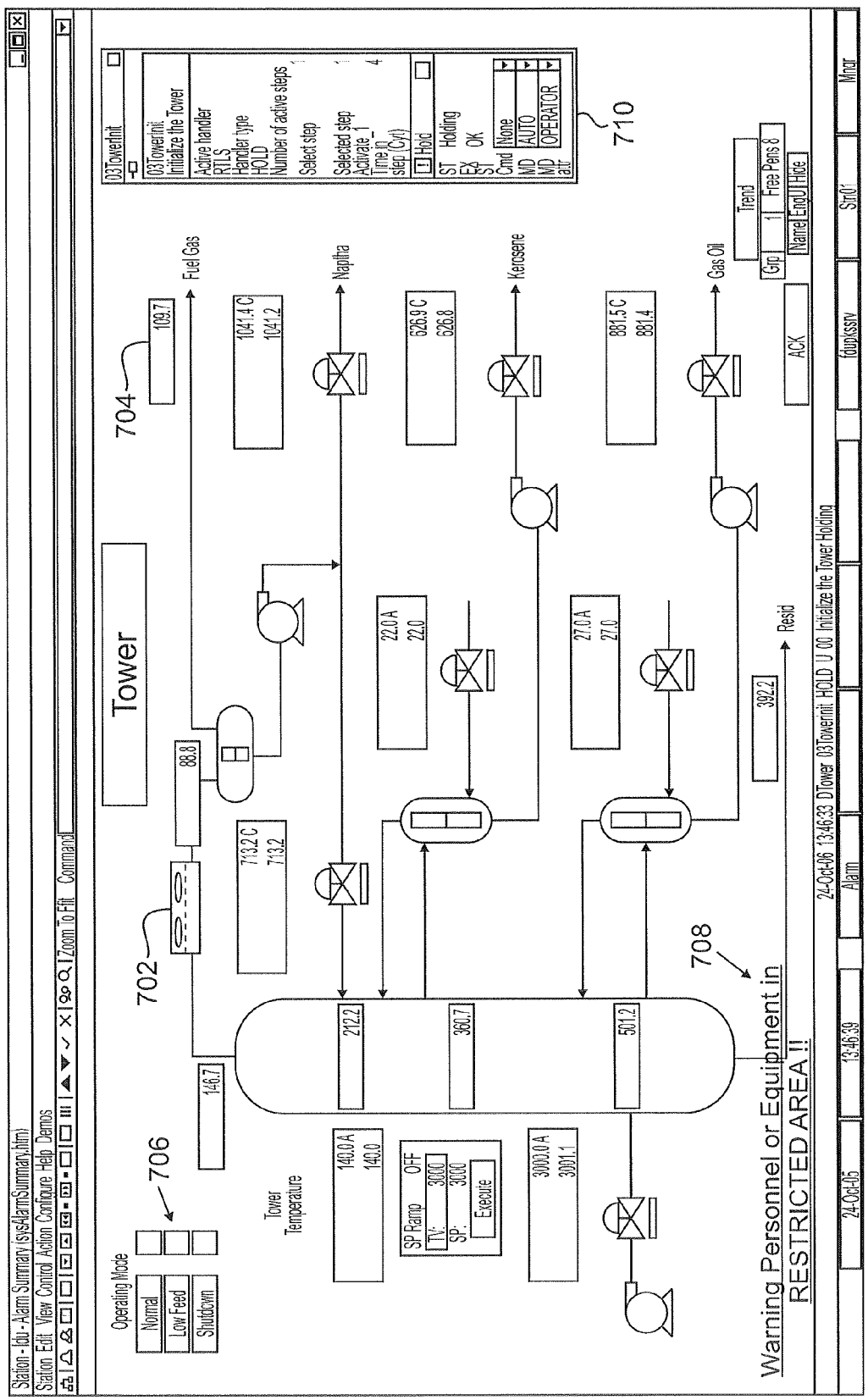

A third user interface 700 is shown in FIG. 7. In this example, the user interface 700 represents a "board operator view" used by users who are overseeing or controlling an industrial process. In this example, the user interface 700 is used to control the operations of a tower in an oil and gas refinery. Here, various symbols 702 are used to represent the actual components in the industrial process. These symbols 702 could, for example, represent valves, pumps, and other components in an oil and gas tower. Various values 704 are also presented in the user interface 700. The values 704 identify the current status of the industrial process, such as temperatures, flow rates, valve and pump settings, and any other or additional characteristics of the oil and gas tower. Various controls 706 could be provided in the user interface 700, such as radio buttons used to select the mode of operation for the oil and gas tower.

Tracking data can be used in various ways in FIG. 7. For example, the presence of unauthorized people or assets in a restricted area could be indicated using a warning 708. The warning 708 could include a link that, when selected by the user, presents the user interface 300. This may allow, for example, the user to quickly determine the location and identity of the unauthorized person or asset.

The tracking data can also be integrated with other tools used to control the oil and gas tower or other industrial process. For example, a window 710 could have various controls for selecting the step during a tower initialization process. In this example, however, the tower initialization process has been placed into a "Hold" state. Here, the data collected by the RTLS server 108 indicates that an unauthorized person or asset has been located within a restricted area (such as within the tower). The tower initialization process is therefore placed on hold, thereby supporting the use of "interlocks" that help to prevent actions that could cause injury to people or damage to assets. In this way, the control over an industrial process can incorporate tracking data. The control over an industrial process can incorporate tracking data in any other or additional manner.

Although FIGS. 3 through 7 illustrate various examples of user interfaces generated using people and asset tracking information in a process control system, various changes may be made to FIGS. 3 through 7. For example, the contents and arrangement of the user interfaces shown in FIGS. 3 through 7 are for illustration only. The user interfaces could include any other or additional contents in any suitable arrangement. Also, different user interfaces could be used to provide the same functionality as the user interfaces in FIGS. 3 through 7, and other or additional user interfaces could use the people and asset tracking information in any suitable manner.

Figure 8:
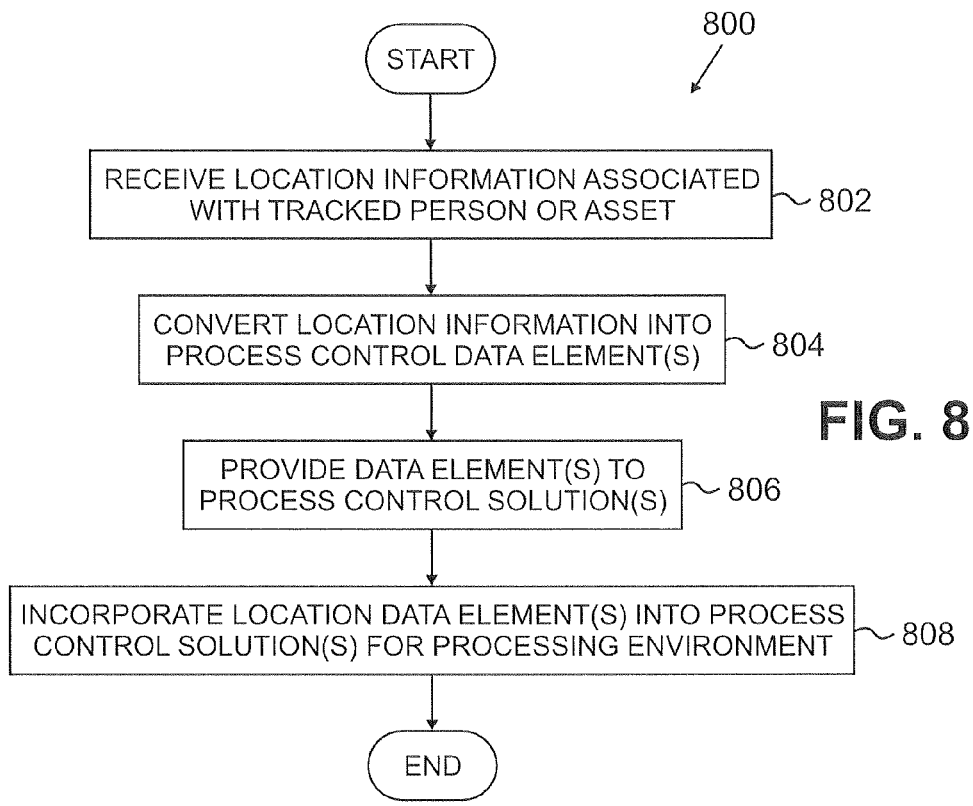
FIG. 8 illustrates an example method for integrating people and asset tracking information into a process control system according to one embodiment of this disclosure.

FIG. 8 illustrates an example method 800 for integrating people and asset tracking information into a process control system according to one embodiment of this disclosure. The embodiment of the method 800 shown in FIG. 8 is for illustration only. Other embodiments of the method 800 could be used without departing from the scope of this disclosure. Also, for ease of explanation, the method 800 is described as being used by the device 200 in FIG. 2 within the RTLS server 108 or the process control server 106 in the process control system 100 of FIG. 1. The method 800 could be used by any other suitable device and in any other suitable system.

The device 200 receives location information associated with a tracked person or asset at step 802. This may include, for example, the device 200 receiving the location data from wireless devices 118a-118d via the wireless access points 116a-116d and the gateway 114. This may also include the device 200 receiving the location data from RFID tags 126a-126b and other RFID-enabled devices 128 via the RFID receivers 130a-130b. The location information could have any suitable format, such as ASCII strings.

The device 200 converts the received location information into one or more process control data elements at step 804. This may include, for example, the controller 204 converting the location data into one or more data elements that can be incorporated into various process control solutions, which represent programs or other logic used to control a processing environment or perform other actions associated with a processing environment. As a particular example, this could include the middleware driver 208 or OPC server 210 converting ASCII strings into OPC or SCADA data points.

The device 200 provides the one or more data elements to one or more process control solutions at step 806. This could include, for example, the device 200 (if it represents the RTLS server 108) providing the data elements to the process control server 106. This could also include the device 200 (if it represents the process control server 106) making the data elements available to other logic implemented or supported by the process control server 106.

At this point, the one or more data elements can be incorporated into the one or more process control solutions for a processing environment at step 808. This may include, for example, the process control server 106 using the locations of various people and assets to perform a wide variety of process control functions. For example, this data could be used to perform various mitigation and prevention functions. Mitigation functions generally help to alleviate the effects of a disaster or other emergency or incident. Examples can include identifying personnel who successfully evacuate to safe zones (often called "mustering" or "souls on board" monitoring) after an explosion or chemical release. Prevention functions generally help to avoid disasters or other problems or incidents. Examples can include ensuring that an area is evacuated or that required personnel are present before a process is initiated or terminated. The location data could be used in any other or additional manner.

Although FIG. 8 illustrates one example of a method 800 for integrating people and asset tracking information into a process control system, various changes could be made to FIG. 8. For example, while shown as a series of steps, various steps in FIG. 8 could occur in parallel or overlap.

FIGS. 9 through 13 illustrate example methods for using people and asset tracking information in a process control system according to one embodiment of this disclosure. The embodiments of the methods shown in FIGS. 9 through 13 are for illustration only. Other embodiments of the methods could be used without departing from the scope of this disclosure. Also, for ease of explanation, the methods are described as being used by the process control server 106 in the process control system 100 of FIG. 1. The methods could be used by any other suitable device and in any other suitable system.

The methods shown in FIGS. 9 through 13 illustrate example ways in which tracking data can be used in a process control system 100. These uses are provided as examples only. Tracking data can be used in a process control system 100 in any other or additional manner.

Figure 9:
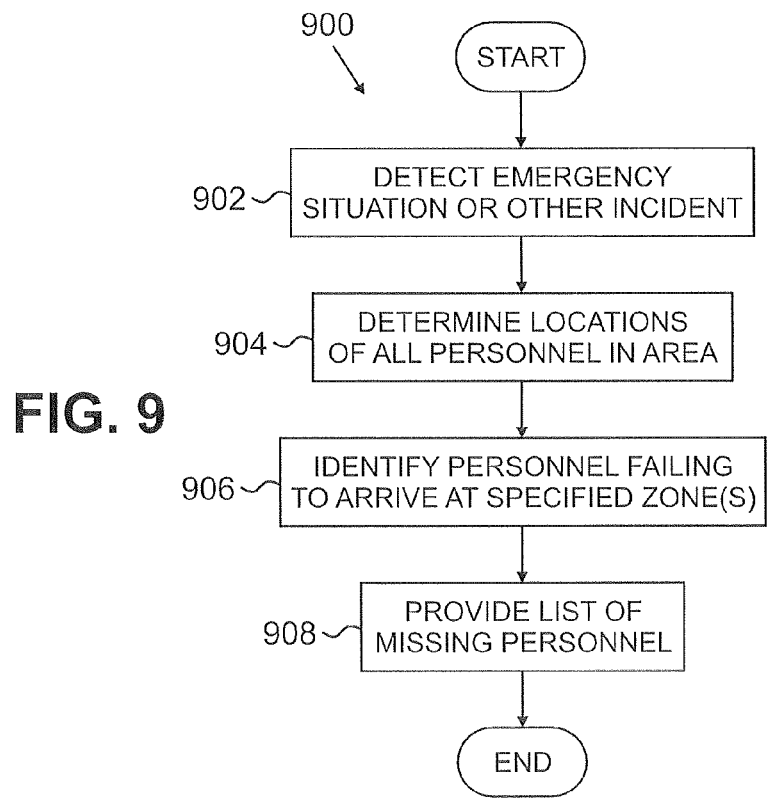
FIGS. 9 through 13 illustrate example methods for using people and asset tracking information in a process control system according to one embodiment of this disclosure.
Figure 10:
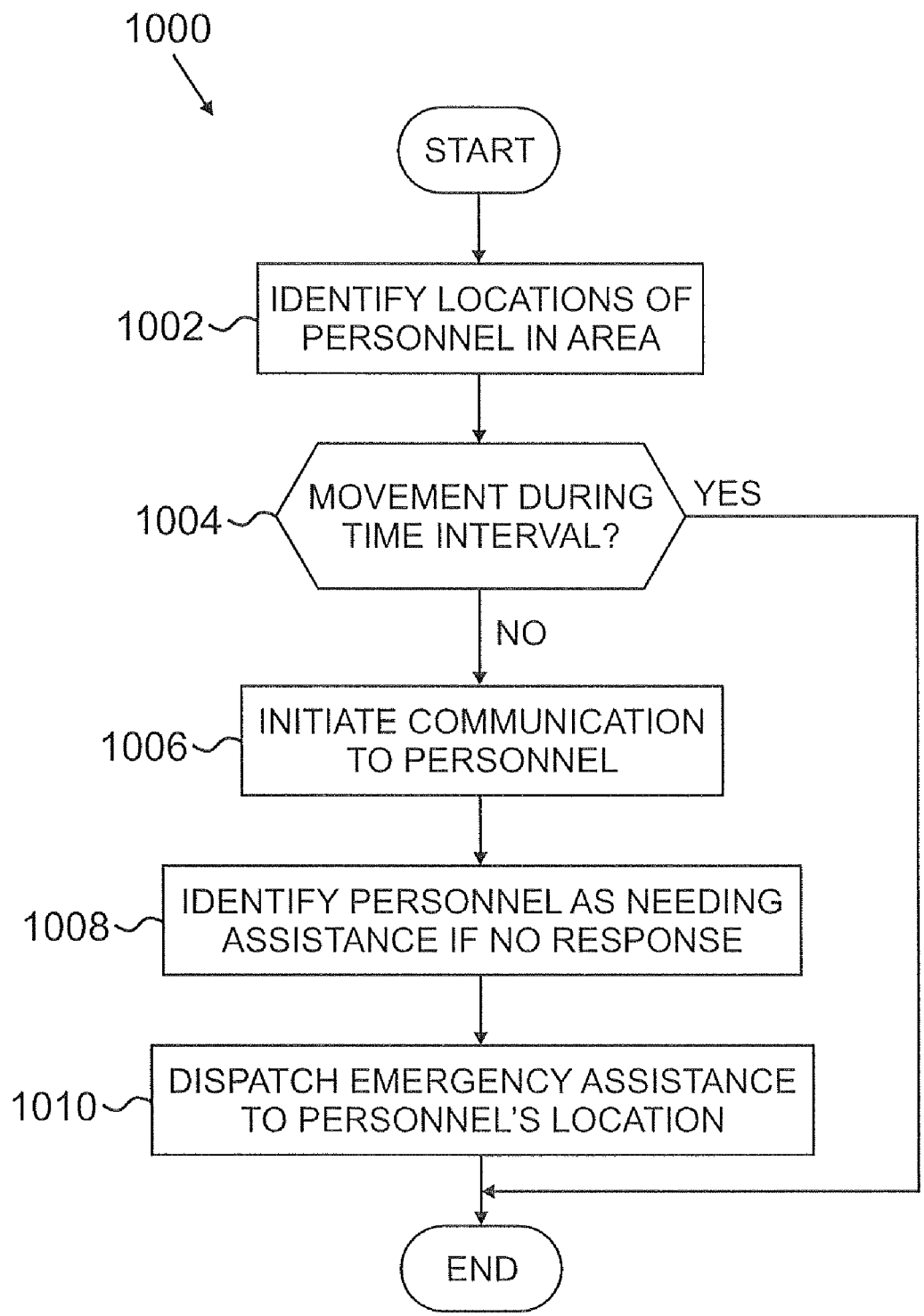
Figure 11:
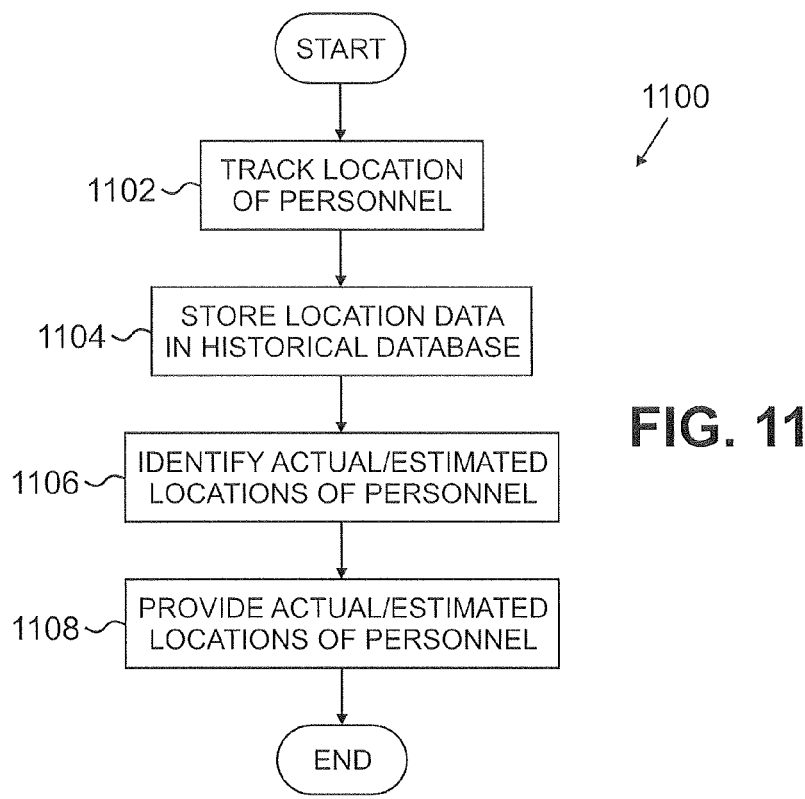

The methods of FIGS. 9 through 11 represent mitigation methods. In FIG. 9, the process control server 106 detects an emergency situation or other incident in a processing environment. This could include the process control server 106 detecting a user or other personnel activating an alarm. This could also include the process control server 106 detecting irregular conditions in readings from various sensors distributed in the processing environment. The process control server 106 determines the locations of all personnel in the relevant area at step 904. The process control server 106 also identifies any personnel failing to arrive at one or more specified zones at step 906. This could include the process control server 106 using historical and current data to identify the actual or estimated locations of all personnel or personnel in a particular part of a processing environment. As a particular example, all personnel could be required to meet in designated zones after an incident (such as a chemical release, mine cave-in or explosion, or a security breach). The process control server 106 could identify the locations of the personnel and determine if any personnel failed to reach the designated zones. The process control server 106 could then provide a list of the personnel failing to reach the designated zones at step 908. In this way, the process control server 106 supports "mustering" or "souls on board" monitoring by identifying personnel who may be in trouble after an incident.

In FIG. 10, the process control server 106 supports "man down" monitoring by identifying if and when personnel may be injured. The process control server 106 identifies the locations of different personnel in an area at step 1002. This could include identifying the personnel in all or part of a processing environment. For each identified personnel, the process control server 106 determines if movement is detected during a specified time interval (such as 15 minutes) at step 1004. If movement is detected, the method 1000 ends. Otherwise, if no movement is detected, the process control server 106 initiates a communication (such as a radio communication) to the non-moving personnel at step 1006. The communication could take place automatically, such as when the process control server 106 causes an automated message to be sent to the personnel and waits to see if a response is received. The communication could also take place manually, such as when the process control server 106 informs a user who then attempts to contact the personnel. If the personnel fails to respond to the communication, the personnel is identified as needing assistance at step 1008, and emergency assistance is dispatched to the personnel's identified location at step 1010. Again, these steps could be automated or depend on manual actions of a user.

In FIG. 11, the process control server 106 tracks the locations of personnel in a specified area at step 1102 and stores data identifying the locations of the personnel at step 1104. In the event of an emergency (such as a mine cave-in), the process control server 106 can identify the actual or estimated locations of personnel at step 1106 and provide these locations at step 1108. The actual positions could be determined using data currently being received. The estimated positions could be determined using stored historical data upon a loss of communication with the personnel's devices that provide location information. This may allow, for example, rescuers to identify the actual or estimated positions of people to be rescued. This may also allow the personnel's positions to be coordinated with gas or fire detection systems to identify safe passage for the personnel out of an area.

Figure 12:
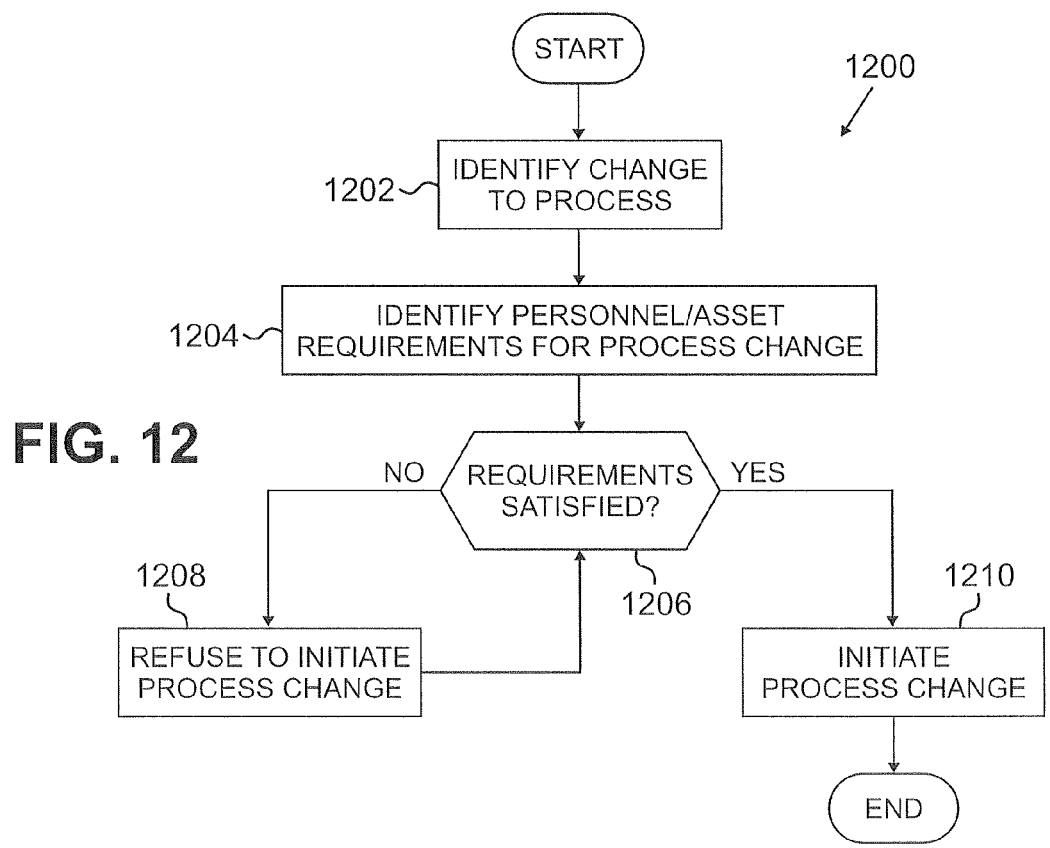
Figure 13:
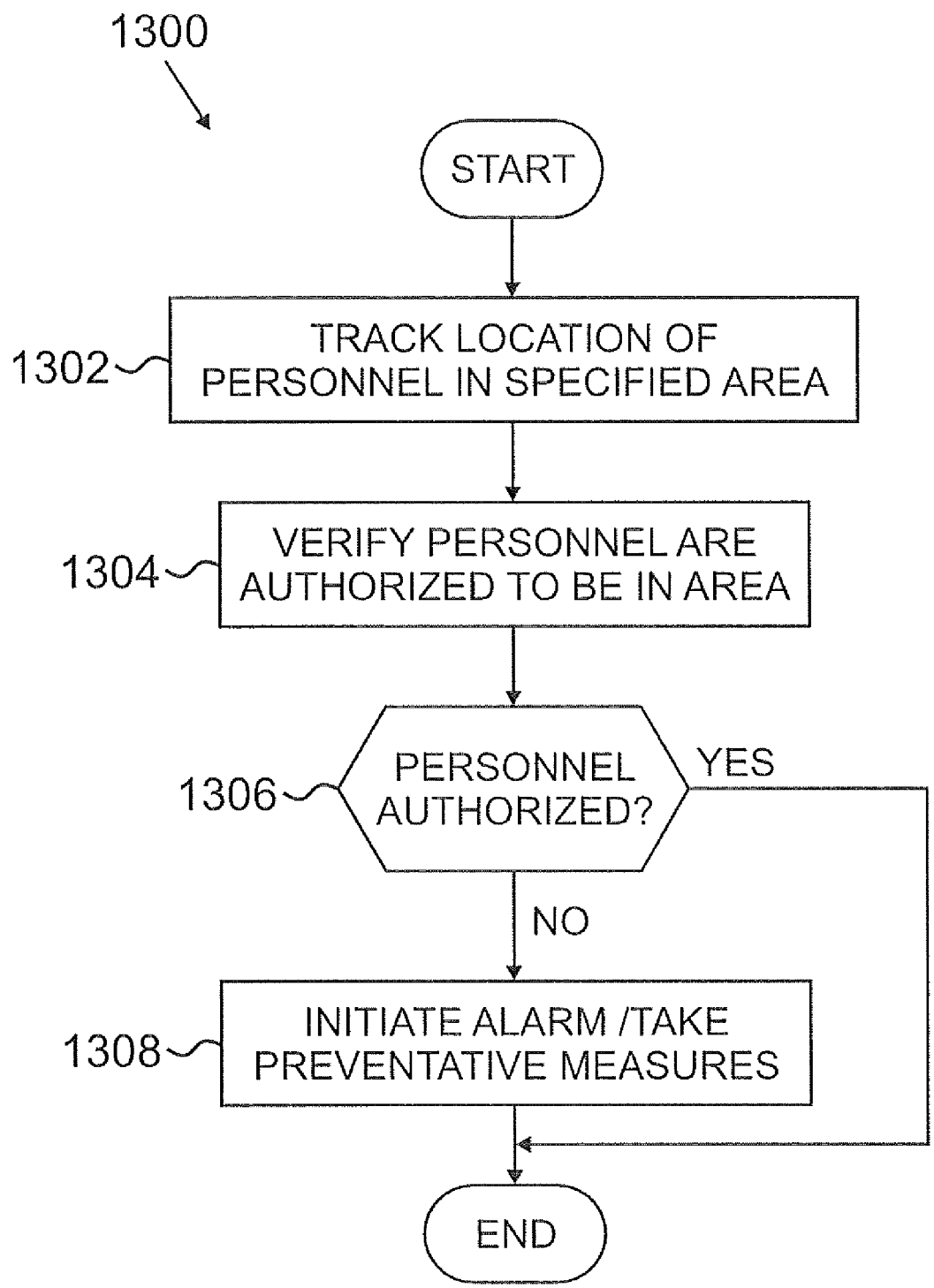

The methods of FIGS. 12 and 13 represent prevention methods intended to help avoid injury to personnel and damage to assets and the processing environment. As shown in FIG. 12, the process control server 106 identifies a change to a process associated with the processing environment at step 1202. This could include the process control server 106 detecting that a particular piece of equipment or collection of equipment (such as an oil and gas tower) is being started up or stopped. The process control server 106 identifies any personnel/asset requirements for the detected process change at step 1204. For example, a company's standard operating procedures may require that appropriate personnel need to be present during equipment startup to manually detect problems with the equipment (and thereby possibly reduce or avoid damage to the equipment). As another example, a company's standard operating procedures may require that an area be evacuated during critical or dangerous activities (such as a volatile process' ramp up, startup, or shutdown). If the personnel/asset requirements are not satisfied at step 1206 (based on the locations of various people or assets), the process control server 106 refuses to initiate the identified process change at step 1208. This could include the process control server 106 ignoring user requests to initiate the process change and informing the user that the requested change has been placed on hold. If and when the personnel/asset requirements are satisfied, the identified process change is initiated at step 1210. In this way, the process control server 106 may use tracking information to ensure that different operating procedures or other policies are enforced in a processing environment. Among other things, this may help to increase safety and reduce costs in the processing environment.

In FIG. 13, location information can be used for security functions. The process control server 106 tracks the locations of various personnel in a specified area at step 1302. The process control server 106 then verifies whether the identified personnel are authorized to be in their current locations at step 1304 and determines if the personnel are authorized at step 1306. Part of these steps could involve a user using "right click" functions to connect to other databases, such as a database identifying the current work order associated with a person in a specified area. If the work order indicates that the person should be working in a different area of a processing environment, the person's presence in the current location could be unauthorized. These steps could also be automated and performed solely by the process control server 106. If the personnel are not authorized, the process control server 106 initiates one or more alarms at step 1308. This could include the process control server 106 displaying an alarm message on a user's display screen and sending a message to appropriate security personnel.

As a particular example of how the method 1300 could be used, in a pharmaceutical plant, entering into one particular area may bar entry into another area for many months (due to possible cross contamination). In the event an individual inadvertently follows somebody else into a now restricted area, an alarm can be sounded and secondary access doors can be locked, thereby preventing access to and contamination of the now restricted area.

Although FIGS. 9 through 13 illustrate examples of methods for using people and asset tracking information in a process control system, various changes may be made to FIGS. 9 through 13. For example, while shown as a series of steps, various steps in these figures could occur in parallel or overlap. Also, tracking data can be used in any other or additional manner.

The following information represents additional details regarding a specific implementation of the process control system 100. These details are provided for illustration and explanation only. Other embodiments of the process control system 100 that differ from the following description can be used without departing from the scope of this disclosure.

In some embodiments, the RTLS server 108 or the process control server 106 could receive and process any suitable location data, including location data generated using GPS, UWB, Wireless Fidelity (WiFi), and active and passive RFID techniques. Location data could have associated qualities, such as good, bad, or uncertain. The RFID receivers 130a-130b could be wired to a network (such as an Ethernet network) and receive power over the network (such as using Power over Ethernet), or the RFID receivers 130a-130b could communicate over a wireless network.

The tracking functionality could operate over large areas (including those exceeding one million square feet) and coexist with other networks (such as other RFID networks, IEEE 802.11, 802.15, or 802.16 networks, Bluetooth networks, cellular/cordless/area telephone networks, and two-way radio networks). The tracking functionality could be robust in the presence of RF interference from legitimate RF sources and in the presence of heavy rain, sleet, snow, or other weather. The tracking functionality could utilize unlicensed frequency bands for communication, and any necessary certifications (such as FCC certifications) could be obtained.

Different end devices (118a-118d, 126a-126b, 128) could support different qualities of service or "QoS" (such as for different types of messages, like standard reports and emergency messages). Also, different end devices could support different transmission times (such as once a second to once every 60 minutes). For a given QoS class, messages within the class can be delivered to a destination in the order the messages are generated at the source. Messages could be delivered in a timely manner, such as when the worst-case latency and variation in latency are both less than 50% of the reporting period. The probability that an erroneous packet is accepted could be low, such as 10E-6.

In a wireless network providing the location data (such as a network formed from the wireless access points 116a-116d or the RFID receivers 130a-130b), a single failure may not degrade the overall performance of the process control system 100. Also, a single failed wireless link may not result in the loss of connectivity (unless the failed link was the last link in the path to an end node). If multiple links in the wireless network fail, communication services that do not rely on the failed links may continue to satisfy the performance requirements for the wireless network. New receivers (such as new wireless access points 116a-116d or RFID receivers 130a-130b) could be added without requiring a reboot or reinitialization of the system and without causing a loss of connectivity. If an existing receiver loses contact with the wireless network, the receiver can later re-establish contact without user intervention. The number of receivers can be scalable, and a single interface device could connect to all receivers. The wireless network could accommodate at least 5,000 tags and other devices reporting every second and at least 10,000 tags and other devices reporting every ten seconds. A violation of the wireless performance requirements in one part of the wireless network may not propagate to other parts of the wireless network. Components of the wireless network may satisfy the specifications in Table 1.

TABLE 1

| Factor | Operative and Storage Limits | Transportation Band |
|---|---|---|
| Ambient Temp Range | −40 to 85° C. | −40 to 85° C. |
| Temp Rate of Change | <=1° C./min | <=5° C./min |
| Relative Humidity | 5 to 95% (non-condensing) | 5 to 95% (non-condensing) |

For security in the wireless network, the process control system 100 may support the ability to hide transmission packets in order to make it harder for eavesdroppers to recover information. Data in transmission packets can be encrypted or otherwise protected against tampering, and trusted nodes can be used to confirm the authenticity of the sources of received messages. This may help to prevent hackers from masquerading as valid RFID receivers. To help protect against denial of service attacks, the wireless network may be able to resist jamming on narrow frequency bands, resist neglectful and greedy nodes, resist "black holes," and resist packet flooding. A security layer in the wireless network may be able to detect collisions and to detect and correct desynchronization attacks. Proper synchronization could be maintained throughout the network within 100 ms. Any security protocols could consume only a modest amount of CPU and transmission time.

Various tools can be used to set up the wireless network. For example, various engineering utilities can be used to perform site surveys prior to installation of the wireless network. Also, simulation tools can be used to simulate different configurations of the wireless network. Once installed, a user could have access to comprehensive information regarding the health of the wireless network and an identification of any problem areas. Radio link quality can be measured at each node in the wireless network and reported upon request.

For location management, the process control system 100 may allow users to visualize people and asset locations on maps. Location data can be imported and exported, and an import tool could validate the quality of the data (such as by ensuring there are no duplicate asset names). Maps, architecture drawings, and other images could also be imported into the system, such as in bitmap (.bmp), JPEG (.jpg), and drawing interchange format (.dxf) files. Users can draw and define areas in the imported maps and other images, such as by defining restricted areas and assigning names to the areas. Predefined shapes could be provided (such as circles and squares or other polygons) for use in defining areas, or ad-hoc shapes could be drawn by the user. Zooming can be supported when viewing the maps and other images. Maps and other images could be arranged hierarchically, such as when a higher-level map is displayed and a lower-level (more detailed) map is displayed when the user selects an area of the higher-level map. New people or assets could be added to the system individually or in multiples or bulk, and attributes of the people and assets could allocated and configured. Icons for people and assets could be customized by users, such as by allowing the import of JPEG images for use as icons. Icons may change color depending on the circumstances, such as when a personnel icon changes color when the person enters a restricted area. A user can right click on a person or asset icon to review information about that person or icon and possibly pull data from other databases. The user can also type in a person or asset's name to locate the person or asset in a map or other image (where the person or asset icon is identified, such as by using a specified color).

Reports could be generated using the data collected by the process control system 100. Reports could be predefined or specified by the user. The reports could, for example, be viewed by selecting the appropriate tab in a set of tabs (where another tab allows the user to view the maps or other images). As an example of the reports, a duration report could identify the length of time that each person or asset has been in a specific area (with start and stop times).

The individual end devices (118*a*-118*d*, 126*a*-126*b*, 128) could operate using battery power, such as batteries with an operational life of three years at a ten-second reporting interval. Diagnostic messages warning of the need to replace a battery can be sent at least four weeks prior to device failing from a power failure. The user can change the reporting rate of the end devices remotely. Replacement of the battery in a device could be done by conventional operators (not maintenance or technical personnel), may require less than one minute to perform, and may have minimal impact on the operation of the device. Configuration data may be maintained in a device during a battery replacement.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   receiving one or more process control data elements defining a location associated with a person within a processing environment, the location based on an Ultra Wide Band (UWB) Radio Frequency Identification (RFID) tag associated with the person, the processing environment comprising industrial equipment configured to manipulate one or more materials to implement an industrial process; and
   managing a change to the industrial process based on the one or more process control data elements, wherein managing the change to the industrial process comprises:

identifying a request to initiate the change to the industrial process;
determining whether a personnel requirement is associated with the change to the industrial process, the personnel requirement comprising one or more specified personnel or types of personnel;
initiating the change to the industrial process when the one or more process control data elements satisfy the personnel requirement; and
controlling at least some of the industrial equipment in the processing environment to implement the change to the industrial process.

2. The method of claim 1, wherein the personnel requirement is related to a location of the one or more specified personnel compared to a location of the industrial equipment.

3. The method of claim 1, wherein the Ultra Wide Band (UWB) Radio Frequency Identification (RFID) tag has a range of up to 1,000 feet line of sight and a range of approximately 150 to 200 feet inside the processing environment.

4. The method of claim 1, further comprising:
determining whether a specified area of the processing environment has been evacuated; and
controlling at least some of the industrial equipment in the processing environment based on whether the specified area has been evacuated.

5. The method of claim 1, wherein controlling at least some of the industrial equipment in the processing environment comprises:
determining whether the one or more specified personnel or types of personnel are present in a specified area of the processing environment; and
controlling at least some of the industrial equipment in the processing environment based on whether the one or more specified personnel or types of personnel are present in the specified area.

6. The method of claim 1, further comprising:
tracking the location of the person over time;
determining that at least a part of the processing environment is now restricted to the person based on the tracked locations; and
preventing the person from entering the now restricted part of the processing environment.

7. The method of claim 1, further comprising:
tracking the location of the person; and
verifying whether the person is authorized to be in a current location.

8. The method of claim 1, further comprising:
tracking locations of multiple people in the processing environment; and
identifying any people failing to reach specified zones of the processing environment during an incident in the processing environment.

9. The method of claim 1, further comprising:
tracking locations of multiple people in the processing environment; and
identifying a current actual or estimated location of at least one person to be rescued in the processing environment.

10. The method of claim 1, further comprising:
tracking the location of the person over time;
determining if the person fails to move for a specified amount of time; and
dispatching emergency personnel to the person's location if the person fails to move for the specified amount of time.

11. The method of claim 1, further comprising generating a user interface, the user interface graphically identifying the location associated with the person.

12. An apparatus, comprising:
at least one memory configured to store one or more process control data elements defining a location associated with a person within a processing environment, the location based on an Ultra Wide Band (UWB) Radio Frequency Identification (RFID) tag associated with the person, the processing environment comprising industrial equipment configured to manipulate one or more materials to implement an industrial process; and
at least one controller configured to manage a change to the industrial process based on the one or more process control data elements by:
identifying a request to initiate the change to the industrial process;
determining whether a personnel requirement is associated with the change to the industrial process, the personnel requirement comprising one or more specified personnel or types of personnel;
initiating the change to the industrial process when the one or more process control data elements satisfy the personnel requirement; and
controlling at least some of the industrial equipment in the processing environment to implement the change to the industrial process.

13. The apparatus of claim 12, wherein the Ultra Wide Band (UWB) Radio Frequency Identification (RFID) tag has a range of up to 1,000 feet line of sight and a range of approximately 150 to 200 feet inside the processing environment.

14. The apparatus of claim 12, wherein the at least one controller is further configured to:
determine whether a specified area of the processing environment has been evacuated; and
control at least some of the industrial equipment in the processing environment based on whether the specified area has been evacuated.

15. The apparatus of claim 12, wherein the at least one controller is configured to control at least some of the industrial equipment in the processing environment by:
determining whether the one or more specified personnel or types of personnel are present in a specified area of the processing environment; and
controlling at least some of the industrial equipment in the processing environment based on whether the one or more specified personnel or types of personnel are present in the specified area.

16. The apparatus of claim 12, wherein the at least one controller is further configured to:
track the location of the person over time;
determine that at least a part of the processing environment is now restricted to the person based on the tracked locations; and
prevent the person from entering the now restricted part of the processing environment.

17. The apparatus of claim 12, wherein the at least one controller is further configured to:
track locations of multiple people in the processing environment; and
identify any people failing to reach specified zones of the processing environment during an incident in the processing environment.

18. The apparatus of claim 12, wherein the at least one controller is further configured to:
track locations of multiple people in the processing environment; and
identify a current actual or estimated location of at least one person to be rescued in the processing environment.

19. The apparatus of claim 12, wherein the at least one controller is further configured to:
    track the location of the person over time;
    determine if the person fails to move for a specified amount of time; and
    dispatch emergency personnel to the person's location if the person fails to move for the specified amount of time.

20. A computer readable storage medium embodying a computer program, the computer program comprising computer readable program code that when executed performs the following steps:
    receiving one or more process control data elements defining a location associated with a person within a processing environment, the location based on an Ultra Wide Band (UWB) Radio Frequency Identification (RFID) tag associated with the person, the processing environment comprising industrial equipment configured to manipulate one or more materials to implement an industrial process; and
    managing a change to the industrial process based on the one or more process control data elements, wherein managing the change to the industrial process comprises:
        identifying a request to initiate the change to the industrial process;
        determining whether a personnel requirement is associated with the change to the industrial process, the personnel requirement comprising one or more specified personnel or types of personnel;
        initiating the change to the industrial process when the one or more process control data elements satisfy the personnel requirement; and
        controlling at least some of the industrial equipment in the processing environment to implement the change to the industrial process.

21. The method of claim 11, wherein:
the control data elements comprise global positioning system data;
graphically identifying the location associated with the person comprises one or more of:
    displaying the location associated with the person within one foot of a real-time location of the person;
    providing a three-dimensional representation of the person;
    providing a pictorial representation of the person; and
    providing profile information of the person; and
generating the user interface further comprises providing one or more of:
    a real-time video of the industrial equipment;
    text identifying the industrial equipment and controls for invoking particular functions associated with the industrial equipment; and
    alarms generated associated with the person.

22. The method of claim 21, further comprising:
in response to an evacuation event, sending a text message to the person regarding exit paths.

* * * * *